United States Patent [19]

Okuyama et al.

[11] 3,862,003
[45] Jan. 21, 1975

[54] METHOD OF SEPARATING AND RECOVERING MUCOPOLYSACCHARIDES FROM CONNECTIVE TISSUES OF ANIMALS

[75] Inventors: Takashi Okuyama; Keiichi Yoshida; Katukiyo Sakurai; Takashi Ogura, all of Tokyo; Katuyuki Horie, Sendai; Akira Tawada, Tokyo; Tadashi Hara, Kanagawa-ken, all of Japan

[73] Assignee: Siekagaku Kogyo Co., Ltd., Tokyo, Japan

[22] Filed: Oct. 4, 1972

[21] Appl. No.: 295,014

[30] Foreign Application Priority Data
July 5, 1972 Japan................................ 47-66695

[52] U.S. Cl............................. 195/7, 195/4, 195/2, 260/211
[51] Int. Cl.............................................. C12b 1/00
[58] Field of Search...................... 195/1, 2, 4, 7, 6; 260/210, 211

[56] References Cited
UNITED STATES PATENTS
3,451,996  6/1969  Sumyk et al............................ 195/7

OTHER PUBLICATIONS
Lowther, et al., Archives of Biochem. and Biophysics, 118, pp. 1–11 (1967), Chem. Abstracts, 70:9590v.
Sana, et al., Archives of Biochem. and Biophysics, 130, pp. 690–692 (1969).

Primary Examiner—Lionel M. Shapiro
Assistant Examiner—Thomas G. Wiseman
Attorney, Agent, or Firm—Sherman & Shalloway

[57] ABSTRACT

A method of extracting mucopolysaccharides from connective tissues of animals, which comprises extracting said connective tissues with water at a temperature of 105° to 150°C under an elevated pressure, subjecting the extract to a protease treatment and/or alkali treatment, and then separating and recovering mucopolysaccharides from the aqueous phase.

4 Claims, No Drawings

METHOD OF SEPARATING AND RECOVERING MUCOPOLYSACCHARIDES FROM CONNECTIVE TISSUES OF ANIMALS

This invention relates to a method of separating and recovering mucopolysaccharides from connective tissues of animals, in which a step of extracting mucopolysaccharides from the tissues can be performed commercially by a simple procedure with excellent extracting efficiency.

Methods have already been known to separate and recover mucopolysaccharides from connective tissues of animals by extracting a mucopolysaccharides-containing liquid from the connective tissues, treating the resulting extract with protease and/or alkali to remove protein impurities, and then subjecting the remaining liquid to precipitation with a precipitating agent and/or column chromatography. Previously, the extraction of a mucopolysaccharide-containing liquid from connective tissues of animals has been performed by an alkali extracting method using an aqueous alkali solution, a neutral salt extracting method using an aqueous solution of a neutral salt, an enzyme decomposing method using protease, and a combination of these methods.

These known methods are disadvantageous in respect of the decomposition of mucopolysaccharides, the complexity of operation and/or the length of the extracting time, and prove unsuitable for commercial operation. The alkali extracting method requires two or more degreasing operations in order to prevent oils and fats contained in the connective tissues from being saponified and extracted into the extract in the dissolved state, and to avoid the complexity of recovering the intended mucopolysaccharides and the loss of the mucopolysacccharides during the operation. Furthermore, in this extracting method, careful operational control is required in order to obviate the decomposition of the intended mucopolysaccharides, and even if such a careful control is exercised, significant amounts of mucopolysaccharides decompose. This method also requires an additional operation of neutralizing the alkaline substance present in the extract before recovering the extract.

According to the neutral salt extracting method, the decomposition of mucopolysaccharides can be avoided, but there is the defect that the amount of protein impurities to be dissolved in an aqueous solution of a neutral salt increases. Furthermore, extremely long periods of time are required for extracting mucopolysaccharides.

The enzyme decomposing method has the disadvantage that unless oils and fats contained in the connective tissues are sufficiently removed, the action of the protease is impeded. Therefore, usually two or more degreasing operations are required. Disadvantageously, also, the operation of enzymatic decomposition itself requires complicated control.

It has now been found that a mucopolysaccharide-containing liquid can be advantageously extracted from connective tissues of animals using water only, and that the complicated degreasing operation which has been essential in the conventional method can be omitted and the extract can be obtained in a single step from the attenuated connective tissues. We have thus discovered a method of separating and recovering mucopolysaccharides on an industrial scale, which has overcome all of the difficulties of the prior art such as the decomposition of mucopolysaccharides, the complexity of the operation or the extended length of the extraction time.

Accordingly, it is an object of this invention to provide a method of obtaining high purity mucopolysaccharides from connective tissues of animals in high yields and with commercial advantage, which has overcome the various disadvantages of the prior art.

The above object can be achieved by extracting connective tissues of animals with water under pressure at a temperature of 105° to 150°C., preferably 110° to 130°, and separating the aqueous phase to obtain the extract. The resulting extract, even by mere standing, can easily and efficiently separate into a solid residue phase containing water-insoluble proteins, an oil and fat phase and an aqueous phase containing mucopolysaccharides. This renders the commercial performance of the method extremely easy and efficient.

It has been known that prior to extraction of connective tissues of animals to recover mucopolysaccharides, the starting connective tissues are softened by boiling or steaming to facilitate a subsequent extraction. However, it has not been known to perform the extraction of the connective tissues using water alone at above 105°C. and under pressure. It is known that the above pretreatment operation is carried out in a steam bath, but this is carried out in order to swell especially connective tissues of animals, such as shark skin and facilitate a subsequent extraction. It has been completely unknown that using only water as an extracting agent, a mucopolysaccharide-containing extract can be obtained from connective tissues of animals with good efficiency.

According to the method of this invention, the separation and recovery of mucopolysaccharides from the extract can be performed by known means. The mucopolysaccharide-containing extract is obtained by extracting connective tissues of animals only with water at 105° to 150°C. under an elevated pressure, and separating and recovering the aqueous phase.

Examples of the connective tissues are cartilages or skins of marine animals such as whales, fish such as sharks or land-inhabiting mammals such as cows, pigs, horses, sheep and goats. The cartilages of the land-inhabiting mammals are especially preferred. The use of tracheal cartilages is especially recommended.

Extraction of the connective tissues can be performed by placing the starting connective tissues together with water in a pressurized extracting zone such as an autoclave, and heating them at 105° to 150°C. The heating may be performed by any desired method. For example, the extracting zone can be heated either externally or internally or both externally and internally. For example, the heating can also be carried out by introducing superheated steam into the extraction zone, and discharging it through a pressure adjusting valve.

The extracting temperature may be varied within the range of 105° to 150°C. according to the extracting time, the type of the starting connective tissues, etc. Preferably, it is 110° to 130°C., especially about 120° ± 5°C. The extracting time may be varied according to such factors as the extracting temperature or the type of the starting connective tissue, and usually ranges from 1 to 10 hours.

The starting connective tissues are cut into the desired size and can be used as such. The complicated degreasing operation which is essential in the prior method can be omitted in the present invention.

Since water is used as an extracting agent in the method of this invention, the heat extracting operation at the above-specified temperature is naturally performed under pressure, and a certain pressure condition is automatically set by the temperature of steam.

If the extracting temperature is lower than the lower limit of the above-specified range, the connective tissues are only swollen, and the intended extracting effect cannot be obtained. If, on the other hand, the extracting temperature is higher than the upper limit of the specified range, heat degradation or decomposition which is undesirable to mucopolysaccharides is likely to occur. Hence, the temperature range specified above should be employed.

The resulting extract containing mucopolysaccharides can be easily separated into an insoluble residue, an extracted aqueous phase and a fat phase. There is no special restriction on the method of separation. For example, it may be separated by decantation. However, for commercial operation, filtration and centrifugal separation are convenient. Most commonly, centrifugal separation is employed, and the aqueous solution can be recovered easily by removal of the residue and the fat phase. Thus, a mucopolysaccharide-containing extract can be obtained from connective tissues of animals by far simpler and less time-consuming extracting and separating operations than those of the conventional methods. The fat phase and the residue can be utilized as oil and fat sources and protein sources in various applications. Furthermore, such materials can be recovered in a single step in the separation of the extract.

The resulting mucopolysaccharide-containing extract can be treated by the conventional method, but with more ease. Specifically, the extract is subjected to a known protease treatment and/or alkali treatment, and then the liquid phase is separated. A precipitating agent such as lower aliphatic alcohols containing 1 to 4 carbon atoms, preferably ethanol, is added to the liquid phase to precipitate mucopolysaccharides. The mucopolysaccharides precipitated are separated and recovered by any desired liquid-solid separating procedure such as centrifugal separation or filtration. The mucopolysaccharides can be purified by a known procedure, for example by column chromatography, if desired. After the above-mentioned protease treatment and/or alkali treatment, the liquid phase separated can be directly subjected to column chromatography.

The above-mentioned known protease treatment, alkali treatment, separating operation, and purifying operation can be carried out in various combinations, and if desired, any of these treatments and operations may be repeated two or more times.

Because the method of isolating mucopolysaccharides from the aqueous extracts of connective tissues, obtained by the above method, is a well-known procedure, the detail of this method is not described here except the following.

Proteolytic digestion of the crude extract containing mucopolysaccharides can be carried out with any commercial protease, e.g., papain, pronase, and ficin etc.

The pH and temperature of the crude extract during the proteolysis must be kept at the optimum pH and optimum temperature of each enzyme, e.g., the ranges of pH 4.0 – 9.0 and 20° – 60°C. are ordinarily used.

The period of proteolytic digestion can be from 6 to 24 hours.

Alkali treatment can be carried out with an aqueous solution of sodium hydroxide or potassium hydroxide, etc.

Although the alkali treatment of the crude extract can be done at room temperature, any temperature from 0° to 50°C. is available.

The carrier for use in column chromatography can be chosen from DEAE Sephadex, DEAE cellulose, ECTEOLA cellulose and Dowex 1X2, etc.

The developing solution for the chromatography can be taken from aqueous solutions of sodium chloride, lithium chloride and sodium acetate etc.

Examples of the mucopolysaccharides are chondroitin, chondroitin sulfate, hyaluronic acid, heparin, heparitin sulfate and keratosulfuric acid. The method of this invention is especially preferred for the recovery of chondroitin sulfate and/or hyaluronic acid.

The following Examples are given to illustrate the present invention.

EXAMPLE 1 AND COMPARATIVE EXAMPLES 1, 2, 3 AND 4

An autoclave was charged with 1 Kg of attenuated tracheal cartilage of a bovine and 1 liter of water, and maintained at 121°C. for 4 hours. The treated liquid was immediately subjected to centrifugal separation. To 2 liters of the resulting mucopolysaccharide-containing extract was added Pronase (trade name for protein-decomposing enzyme, product of Kaken Kagaku, Japan) (200,000 units), and the mixture was maintained at 50°C, for 3 hours, followed by centrifugal separation to recover a liquid phase. Sodium hydroxide was added to this liquid phase to an extent of 1N, and the mixture was maintained at room temperature for one hour. Then, 2.5 times the volume of the mixture of ethyl alcohol was added. The resulting precipitate was dissolved in water and neutralized. Again, two times its volume of ethyl alcohol was added. The resulting precipitate was dried to form 20 g of chondroitin sulfate having an S content of 5.8 %.

The quality of the chondroitin sulfate is shown in Table 1 in terms of the specific viscosity (measured by an Ostwald viscometer at 30°C. using a 1 % solution of the chondroitin in isotonic sodium chloride solution), the S content (% by weight) and the N content (% by weight).

For comparison, chondroitin sulfate was prepared in the same way as in Example 1 above except that the mucopolysaccharide-containing extract was obtained by the conventional alkali extracting method (Comparative Example 1) and the enzyme-decomposing extraction method (Comparative Example 2). The qualities of the resulting chondroitin are also shown in Table 1.

Table 1

| Runs | Material | Extracting operation | | | | Quality of chondroitin sulfate | | |
|---|---|---|---|---|---|---|---|---|
| | | First degreasing operation | Attenuating operation | Second degreasing operation | Extracting conditions | Specific viscosity | S content (wt. %) | N content (wt. %) |
| Example 1 | Bovine tracheal cartilage | no (unnecessary) | yes | no (unnecessary) | Extracting only with water at 121°C. for 4 hours in an autoclave | 0.48 | 5.80 | 2.87 |
| Comparative Example 1 | do. | yes (necessary) | yes | yes (necessary) | Extracting with 5N NaOH aq. at 60°C. 1.5 hours | 0.21 | 5.80 | 3.10 |
| Comparative Example 2 | do. | yes (necessary) | yes | yes (necessary) | Extracting at 55°C. for 4 hours using protease (1,500 units) per gram of the starting material | 0.50 | 5.75 | 2.97 |

It is seen from the results shown in Table 1 above that the alkali extracting method in Comparative Example 1 causes an significant degradation by alkali and the quality of chondroitin obtained is poor with a markedly reduced specific viscosity. Comparison of Example 1 with Comparative Example 2 shows that the qualities of chondroitin sulfates obtained are substantially the same and prove as good as natural substances, but that the enzyme-decomposing extracting method requires two degreasing operations which are complicated and time-consuming and also has the disadvantage of using a great quantity of protease. When the degreasing operation was omitted as in Example 1, the enzyme-decomposing extraction became insufficient, and the fats in the extract rendered a subsequent operation extremely difficult. Chondroitin sulfate was separated with the negligence of loss during the operation but with the removal of solidified fats. The resulting product was extremely colored, and devoid of commercial value.

For comparison, the above procedure was repeated except that the extracting operation was performed at 160°C. (Comparative Example 3). As in Comparative Example 1, there was a significant decrease in specific viscosity, and the product had poor quality.

For further comparison, the procedure of Example 1 was repeated except that the material was steamed in a steam bath at atmospheric pressure instead of using the autoclave (Comparative Example 4). A mucopolysaccharide-containing extract that was utilizable could not be obtained.

Table 2

| | Yield (based on 1 Kg of bovine raw tracheal cartilage) | Quality of chondroitin sulfate | | |
|---|---|---|---|---|
| | | Specific viscosity | S content (wt. %) | N content (wt. %) |
| Example 4 | 20 g | 0.48 | 5.80 | 2.87 |
| Comparative Example 3 | 6.2 g | 0.28 | 4.25 | 3.38 |
| Comparative Example 4 | 3.7 g | 0.48 | 5.78 | 2.91 |

EXAMPLE 2

An autoclave was charged with 1.8 Kg of dried attenuated skin of blue sharks and 10 liters of water and heated to 126°C. The contents were then maintained at this state for 4 hours. The treated liquid was immediately subjected to centrifugal separation. To 12 liters of the mucopolysaccharide-containing extract obtained was added 0.2 N sodium hydroxide, and the mixture was allowed to stand overnight at room temperature. Ethanol was then added thereto in an amount twice the volume of the mixture to precipitate mucopolysaccharides. The precipitate was recovered by centrifugal separation, and dissolved in water. The pH of the solution was adjusted to a neutral value with acetic acid. Then, to the solution was added Pronase (360,000 units), and the same enzyme treatment as in Example 1 was carried out, followed by centrifugal separation to recover a liquid phase. The liquid phase was allowed to stand, and the resulting supernatant liquid was passed through a Schiller's column [S. Schiller, et al.; J. Biol. Chem., 236, 983 (1961) ]. The fractions adsorbed to the column were eluted with sodium chloride and separated. Hyaluronic acid was formed in an effluent with a sodium chloride concentration of 0.5 M, and chondroitin sulfate was obtained in an effluent with a sodium chloride concentration of 1.5 M. These fractions were dried, and 18 g of hyaluronic acid and 6.5 g of chondroitin sulfate were obtained. The resulting chondroitin sulfate is a mixture of B-type and C-type in a ratio, as determined by the enzyme analysis method, of 20:80.

EXAMPLE 3

Water (10 liters) was added to 10 Kg of attenuated pig skin, and the mixture was maintained at 115°C. for 1 hour and 30 minutes. The treated liquid was centrifugally separated. The extract obtained was subjected to alkali treatment in the same way as in Example 1, followed by enzyme treatment. It was fractionated and purified using a Schiller's column to afford 12 g of hyaluronic acid and 10 g of chondroitin sulfate. The chondroitin sulfate was of the B-type, and had an S content of 6.3 %.

EXAMPLE 4

Water (10 liters) was added to dried attenuated cartilage of blue sharks, and the mixture was maintained at 120°C. for 4 hours. The treated liquid was centrifugally separated. To 8.5 liters of the resulting extract was added sodium hydroxide to 0.5 N, and the mixture was allowed to stand overnight at room temperature, followed by the same enzyme treatment as in Example 1. Ethyl alcohol was then added in an amount twice the volume of the mixture to precipitate mucopolysaccharides. The precipitate obtained was dissolved in water, and neutralized. Again, ethyl alcohol was added, and the resulting precipitate was dried to afford 210 g of chondroitin sulfate having an S content of 6.5 %.

According to the method of the present invention, mucopolysaccharides can be extracted in good yields within short periods of time without degreasing them by choosing the temperature and time which do not affect the properties of the mucopolysaccharides as natural products.

What we claim is:

1. A method of extracting mucopolysaccharides from connective tissues of animals, which comprises extracting said connective tissues with water at a temperature of 105° to 150°C. under an elevated pressure, subjecting the extract to a protease treatment and/or alkali treatment, and then separating and recovering mucopolysaccharides from the aqueous phase.

2. The method of claim 1 wherein the extracting temperature is 110° to 130°C.

3. The method of claim 1 wherein said connective tissues are cartilages and skins of mammals and fishes.

4. The method of claim 1 wherein the mucopolysaccharide separated and recovered is a compound selected from the group consisting of chondroitin, chondroitin sulfate, hyaluronic acid, heparin, heparitin sulfate and keratosulfate acid.

* * * * *

UNITED STATES PATENT OFFICE
CERTIFICATE OF CORRECTION

PATENT NO. : 3,862,003
DATED : January 21, 1975
INVENTOR(S) : Takashi Okuyama et al It is certified that error appears in the above-identified patent and that said Letters Patent are hereby corrected as shown below:

In the heading, delete "Siekagaku Kogyo Co., Ltd.,", insert -- Seikagaku Kogyo Co., Ltd. --

Signed and sealed this 20th day of May 1975.

(SEAL)
Attest:

RUTH C. MASON
Attesting Officer

C. MARSHALL DANN
Commissioner of Patents
and Trademarks